United States Patent [19]

Gläser

[11] Patent Number: 4,605,243
[45] Date of Patent: Aug. 12, 1986

[54] FOLDING PUSHCHAIR

[75] Inventor: Dieter Gläser, Dachau, Fed. Rep. of Germany

[73] Assignee: PEG Perego Pines Deutschland GmbH, Fed. Rep. of Germany

[21] Appl. No.: 658,665

[22] Filed: Oct. 9, 1984

[30] Foreign Application Priority Data

Oct. 14, 1983 [DE] Fed. Rep. of Germany ....... 3337493

[51] Int. Cl.⁴ .............................................. B62B 7/06
[52] U.S. Cl. ................... 280/642; 280/650; 280/658
[58] Field of Search ............... 280/644, 642, 643, 650, 280/647, 658, 47.34, 655; 297/DIG. 4

[56] References Cited

U.S. PATENT DOCUMENTS

| | | | |
|---|---|---|---|
| 1,695,409 | 12/1928 | Banks | 280/644 |
| 2,419,790 | 4/1947 | Peltier | 280/642 |
| 2,783,053 | 2/1957 | Sheldrick et al. | 280/642 |
| 4,435,012 | 3/1984 | Kassai | 280/643 |

FOREIGN PATENT DOCUMENTS

| | | | |
|---|---|---|---|
| 1835710 | 7/1961 | Fed. Rep. of Germany . | |
| 7402169 | 8/1974 | Fed. Rep. of Germany . | |
| 7510128 | 7/1975 | Fed. Rep. of Germany . | |
| 3102463 | 2/1982 | Fed. Rep. of Germany | 280/642 |
| 664813 | 11/1928 | France . | |
| 28432 | 12/1910 | United Kingdom | 280/642 |
| 1576574 | 10/1980 | United Kingdom | 280/642 |
| 2099376 | 12/1982 | United Kingdom | 280/650 |

Primary Examiner—David M. Mitchell
Attorney, Agent, or Firm—Arnold, White & Durkee

[57] ABSTRACT

A folding pushchair has a chassis provided on each side with two chassis struts (6,7) carrying wheels (8). The struts are pivotally connected together, and swing out of a folded position, in which they lie side by side, into a position of use, in which they are secured by means of a fastening device (14). This device has to swing upwards to release the struts but a seat, and hence the weight of a child in the pushchair bears down on the device (14), thereby avoiding accidental folding in use.

38 Claims, 6 Drawing Figures

FOLDING PUSHCHAIR

The invention relates to a folding pushchair of the kind comprising a chassis, which is provided on each side with first and second chassis struts carrying wheels at their bottom ends and pivotally connected so that they can swing apart out of a folded position, in which they lie side by side, into a position of use, and are securable in the position of use by means of a fastening device; and, joined to the chassis, a push handle, a back part and a seat part.

The object of the invention is to provide a pushchair of this kind, which can be folded quickly and simply from its position of use but is protected against release of its fastening device as long as a child is in the pushchair.

According to the invention the pushchair is characterised in that the push handle is joined on each side of the pushchair to the first chassis strut by means of a first intermediate link and to the second chassis strut by means of a second intermediate link; in that the fastening device is pivotable upwards, about a bearing on the first chassis strut, out of a fastening position, in which it extends rigidly between the first and second chassis struts, into a released position to allow relative movement of the two chassis struts; and in that the seat part is supported on the fastening device in such a manner that it rests on the device when the latter is in its fastening position.

The connection of the push handle to the chassis struts can facilitate and accelerate not only the folding of the chassis but also the movement of the push handle relative to the chassis. The bearing on the fastening device of the seat part ensures that a child sitting in the pushchair will not be endangered by the rapid folding movements of the various parts of the pushchair; as, in the position of use of the pushchair, that is to say with the fastening device in the fastened position, this device is loaded by the weight of a child sitting in the pushchair. The necessary swivelling movement would therefore have to be made against the resulting resistance. Unintentional unlocking is therefore out of the question even if the operator is able to apply the necessary force.

The fastening device may comprise, on each side, an arm which, in the fastening position, extends from the bearing on the first chassis strut to a point of action on the second chassis strut. This construction of the fastening device can be manufactured economically. When not loaded by the weight of a child, the arms can, in a simple manner, make the swivelling movement necessary for release from the fastened position. In addition, they offer good support for a seat surface.

The arms at the sides of the fastening device may be joined together to form a frame by means of crossbars. The frame of the fastening device may then serve as support for a seat board connected to it. This is beneficial, both with regard to the static properties of the fastening device and with regard to possibilities for the support of the seat surface and consequently of the child being carried.

Preferably, the back part is joined to the push handle. This facilitates folding and increases the action of loading by the weight of a child in respect of safety.

A pedal may be provided on the fastening device for the operation thereof, resulting in a simple operating facility for unlocking the fastening device. The simple operating means is made possible only by the safety achieved as described above; there being no danger that confusion of functions will bring about the folding movement as long as a child is still sitting in the pushchair.

One preferred construction is characterised in that an arm of the fastening device is of one-piece rigid construction and has a latching means at its end remote from the bearing on the first chassis strut; and in that the arm is connectable by latching to the second chassis strut in the fastening position. Such rigid arms are components which can be produced economically. Their latching means can, in a simple manner, be so constructed that they move upwards during the swivelling movement. A seat board or other seat surface is moved over its entire length during the swivelling movement. An accidental swivelling movement while the child is still sitting in the pushchair requires, because of the long swivelling arm, a torque which prevents the release of the latching means or signals the danger to the operator.

An advantageous form of construction of the latching means involves a nose on the end of the arm, and a pin over which the nose is engagable is provided on the second chassis strut.

Additional protection against release of the latching means, particularly with the simple rigid construction, is achieved if a spring for holding the latching means in its engaged position is disposed between the arm and the first chassis strut.

Another construction is characterised in that an arm of the fastening device consists of two lever arms each of which is pivoted to a respective one of the first and second chassis struts and which are connected together by an articulation providing a centre of pressure. In this case also the weight of a child still sitting in the pushchair ensures that the pushchair cannot be unintentionally folded up. The two lever arms in their dead centre position, which they assume in the fastened position, act on the chassis and the seat surface in the same way as a rigid arm. A spring is not necessary because there is no latching means to disengage. The movement of the articulation from the dead centre position must be made by a swivelling movement of a lever arm in the upward direction by means of an operating device, that is to say against the weight of a child, if one is in the pushchair. When there is no weight on the seat surface, the latter is also fitted in the region of the articulation. In the folded position the two lever arms lie approximately parallel to one another, in accordance with their articulation on the two chassis struts.

The dead centre position can be achieved in a constructionally simple manner if one of the lever arms has an extension projecting beyond the articulation connecting it to the other lever arm, and that this extension has a stop adapted to bear laterally against the other lever arm. The movement in the downward direction is reliably limited, while the movement in the upward direction, when there is no weight on the seat surface, is not hindered.

Examples of pushchairs according to the invention will now be described with the aid of the accompanying drawings, in which.

Figure 1:
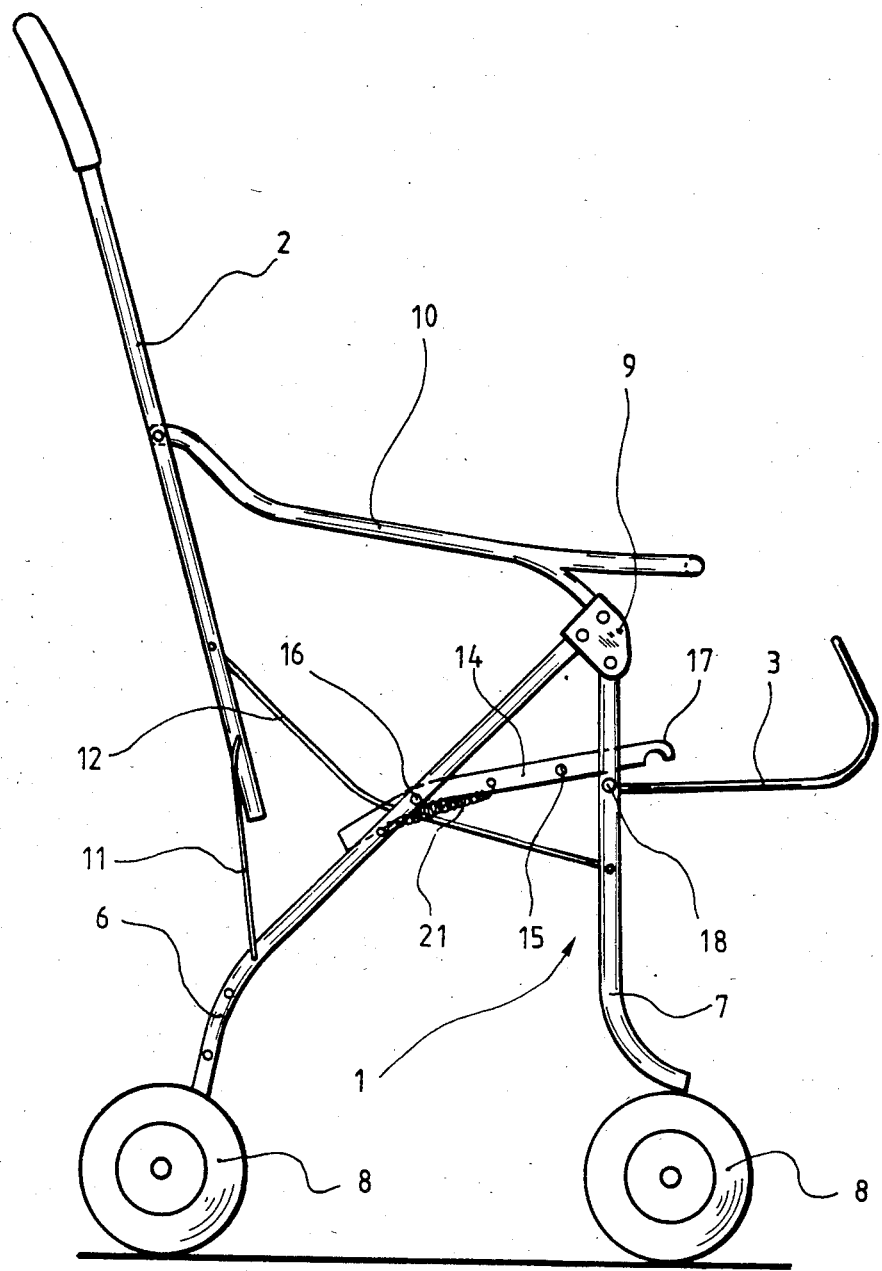
FIG. 1 is a diagrammatical side view of a frame for a pushchair in an intermediate position during folding.
Figure 5:
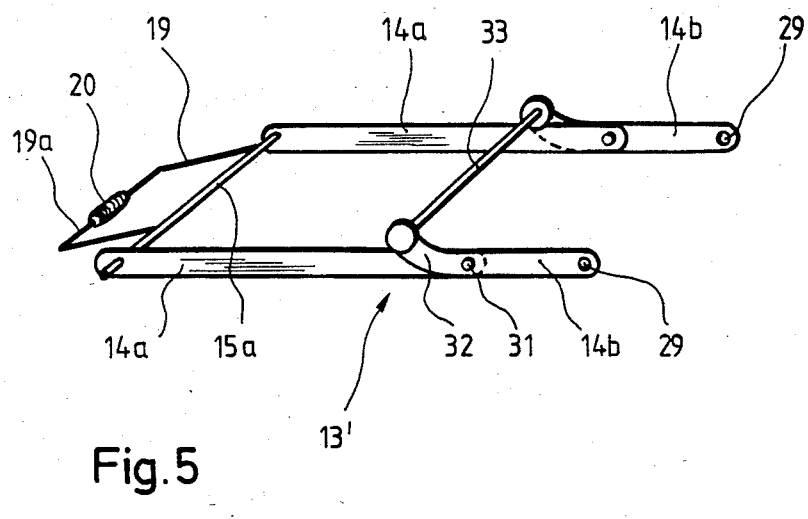
Figure 6:
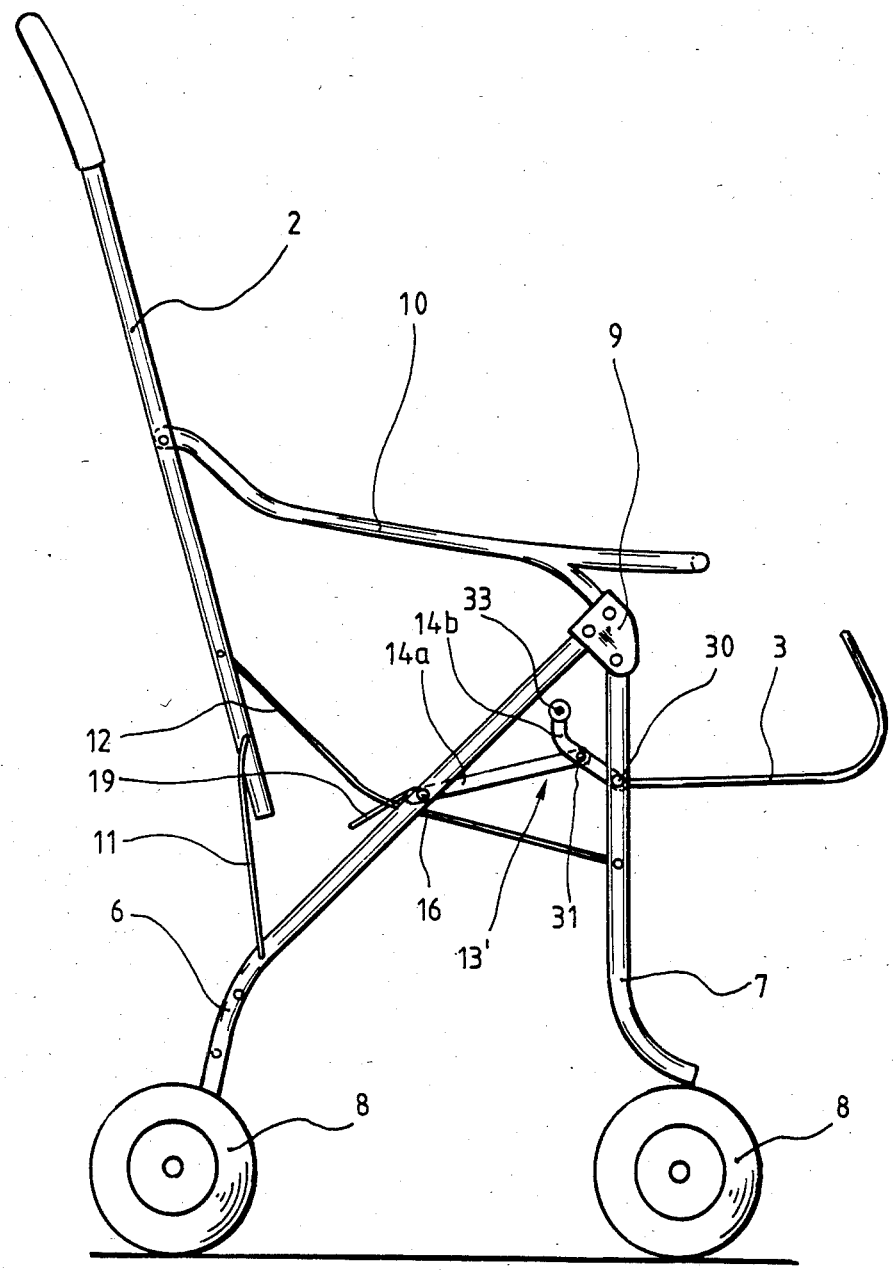

FIG. 5 a detail of a second example on a larger scale; and,

FIG. 6 shows the second pushchair in a position corresponding to FIG. 1.

Figure 3:
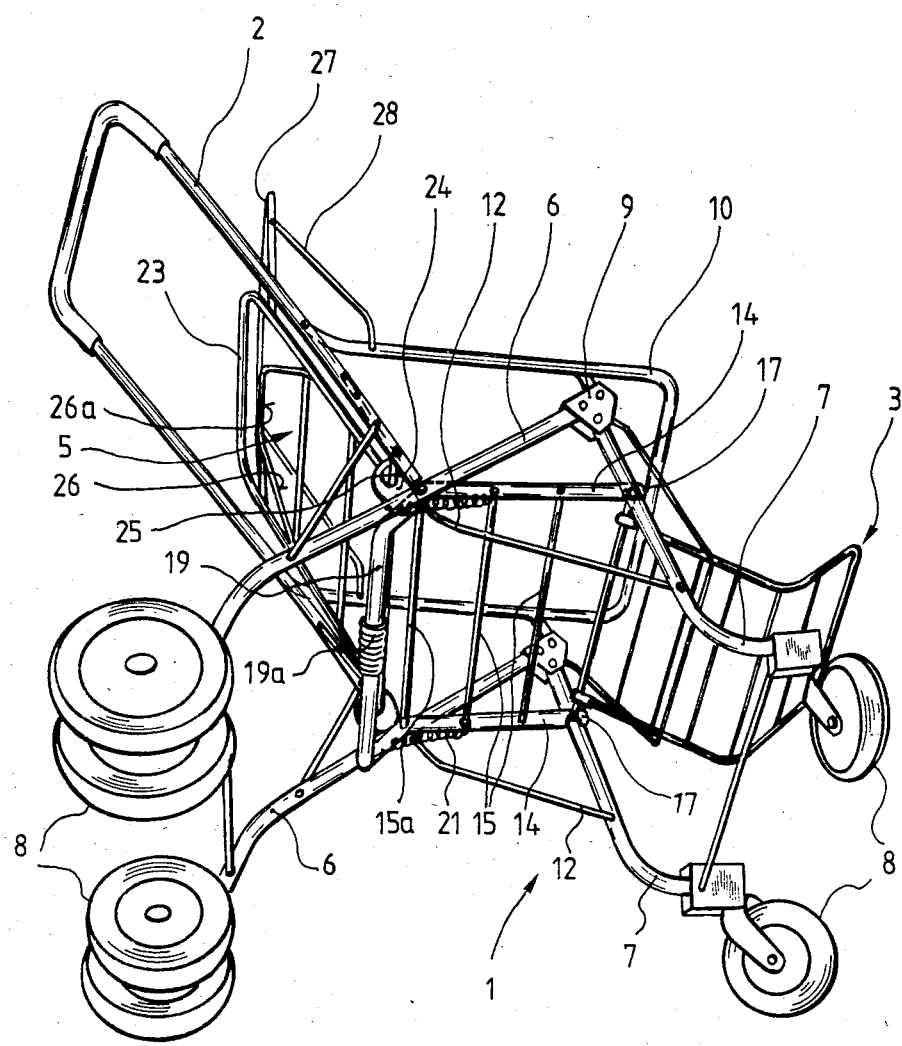
FIG. 3 is a view in perspective of the frame shown in FIGS. 1 and 2, in the position of use.
Figure 4:
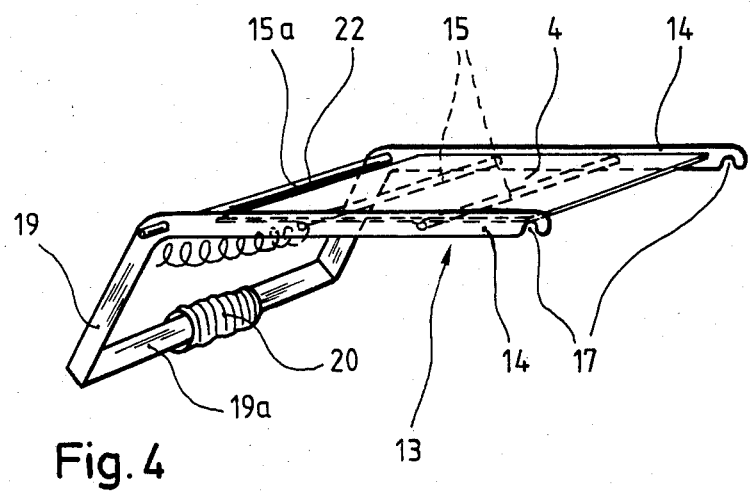
FIG. 4 shows a detail on a larger scale.

The pushchair shown in FIG. 1 comprises a chassis 1, a push handle 2, a foot part 3, and a seat part 4, which is merely indicated in FIG. 4 in the form of a board. A back part 5 of the pushchair can be seen in FIG. 3. All parts of the pushchair which are made of textile material, such as seat coverings, seat side walls and a hood, are omitted from the drawings for the sake of clarity.

The chassis 1 consists essentially of two chassis struts 6 and 7 on each side. At the end of each chassis strut a wheel 8 is mounted. Double wheel sets may also be provided. The other ends of the chassis struts 6 and 7 are in each case articulated side by side on a connecting plate 9, so that they are pivotable relative to each other. They are pivotable in the same plate, so that in a folded position (not shown) of the pushchair they lie with their mutually facing sides directly against one another. On the connecting plate 9 is additionally supported a safety yoke 10, which in plan view is substantially U-shaped and the free ends of which are articulated on the push handle 1 (see FIG. 3, in which, for the sake of clarity, parts of the chassis struts 6 and 7, the connecting plate 9 and parts of the safety yoke 10 have been omitted on the side of the pushchair which lies at the rear from the viewer's viewpoint).

Figure 2:
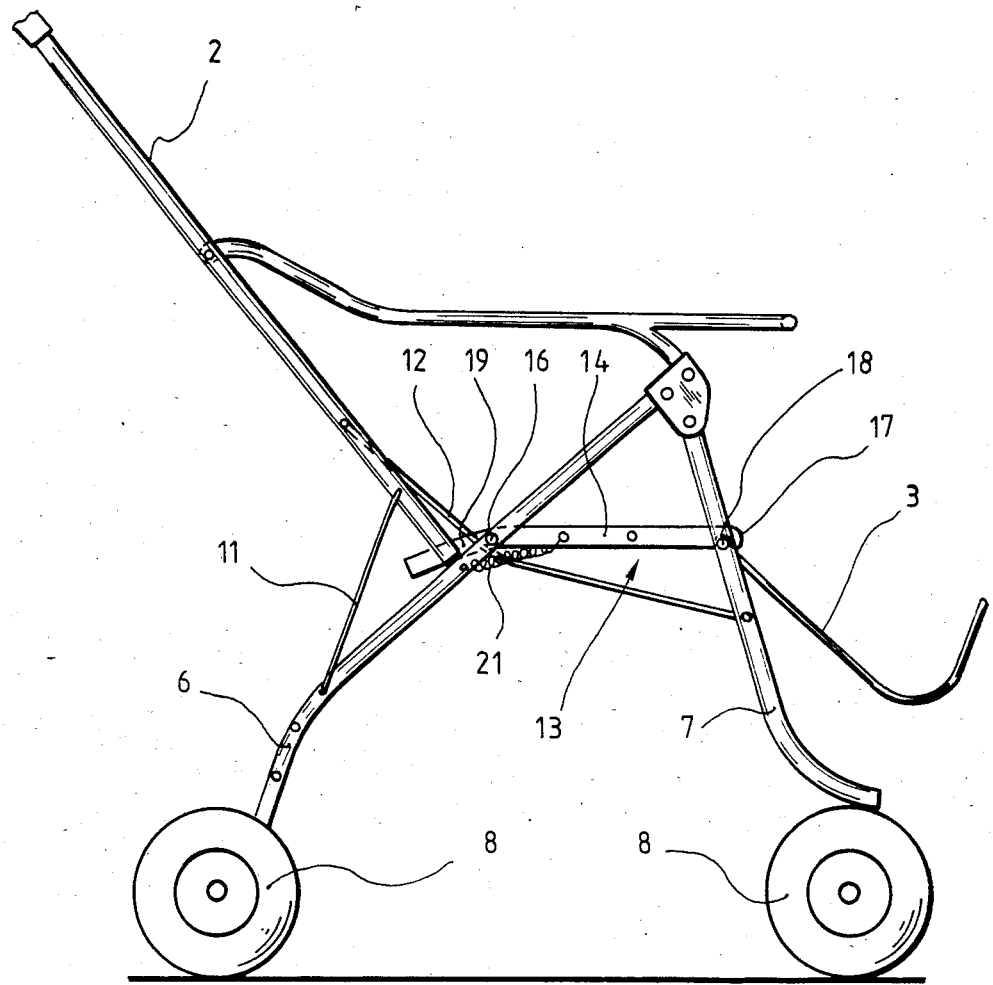
FIG. 2 shows the same frame as FIG. 1 but in the position of use of the pushchair.

The push handle 2 is movably joined by a first intermediate link 11 to the part of the chassis strut 6 which lies near the wheel, and by a second intermediate link 12 to the second chassis strut 7. The latter is the chassis strut situated at the front in the direction of travel. The second intermediate link 12 acts on the push handle 2 above the first intermediate link 11. FIG. 2 shows the position of use of the pushchair. In this position the intermediate links 11 and 12 hold the push handle 2 in such a manner that it is supported by its free bottom end on the chassis strut 6. The point of support has for the sake of clarity been shifted somewhat downwards in the accompanying diagrammatical illustrations. It is expediently situated approximately at seat height, so that the textile coverings of the seat and of the back region, integrated into the push handle (FIG. 3), adjoin one another.

A fastening device 13 fastens the chassis struts 6 and 7 in their open angular position relative to one another when the pushchair is in the position of use shown in FIG. 2. The fastening device 13 is shown on a larger scale in FIG. 4. On both sides it has a rigid arm 14. The two arms 14 are joined by crossbars 15 to form a frame. At one end of the arms 14 the ends of a crossbar 15a project beyond the frame on both sides. It thus engages in a pivot bearing 16 on the first chassis strut 6. At the end remote from the bearing, each arm 4 has a nose 17 which is open at the bottom and which forms the latching means for the fastened position of the fastening device. In this position (FIG. 2) it engages over a pin 18. In FIG. 4 the arms 14 are extended beyond the crossbar 15a to form a U-shaped yoke 19 integral with it, the cross web 19a of which forms a pedal for operating the fastening device. It is provided with a pedal covering 20. In FIGS. 1, 2 and 6 the fact that, as already mentioned, the push handle 2 is set back relative to the chassis strut 6 has the effect that it cannot be seen that the pedal 19a can be reached with the foot from the rear of the pushchair. In FIG. 3, however, the positions of the push handle 2 and of the pedal 19a can be seen correctly.

In its position of use shown in FIG. 2 the fastening device 13 engages by its nose 17 over the pin 18. A tension spring 21, which is fastened at one end to the arm 14 and at the other end to the chassis strut 6, urges the nose 17 into this latching position. The seat 4, indicated in FIG. 4, is fastened by means of mountings 22 on the crossbar 15a and is supported on the arm 14 and the other crossbars 15. It transmits to the arms 14 the weight of a child sitting in the pushchair. For the purpose of folding the pushchair, the operator presses down the pedal 19a with the foot. The arms 14 are thus swivelled upwards and the nose 17 is disengaged. The seat surface 4 participates in the upward swivelling movement. With the simultaneous forward movement of the push handle 2, the chassis struts 6 and 7 swivel towards one another until they reach their final position, one against the other. An intermediate stage in this movement, directly after the unlocking, is shown in FIG. 1. The nose 17 has already lifted off the pin 18, and the angle between the chassis struts has already been somewhat reduced. The push handle 2 is situated with its bottom end already some distance from the strut 6 and can be swivelled further forwards. The tension spring 21 has no further effect.

If the pedal 19a is operated while the seat surface is still carrying a weight, particularly the weight of a child, the weight counteracts the swivelling movement of the arm 4. The operator is thereby prevented from continuing the swivelling movement by force, or at least is warned against doing so.

In addition to the details of the pushchair which have already been described in connection with FIGS. 1 to 4, FIG. 3 also shows the construction of the back part 5. It is not joined to the seat part, so that its position does not hinder the cooperation of the seat part and the fastening device. The seat part 5 comprises a U-shaped back bow 23, which is mounted on the push handle 2 in the region of the free ends of the latter. The mounting is effected by means of a toothed segment 24, which is here indicated on one side only end and in which the back yoke can be fastened and locked in various positions by means of a crossbar 25. The position assumed is maintained by means of springs, which are not shown here. For unlocking purposes the crossbar 25 is joined to a likewise U-shaped pull means 26, the upper yoke 26a of which can be gripped together with the U-web of the back yoke 23. If, when so gripped, the pull means is pulled upwards to the U-web of the back yoke 23, the latter is unlocked in the region of the toothed segment 24 and can be swivelled to another position.

In FIG. 3 it is also indicated how an end wall yoke 27 adjoining the cross web of the back yoke 23 can be swivelled forwards at an angle to the yoke 23. This position of the end wall yoke is in itself assumed when the back yoke 23 is swivelled into a lying position of the pushchair, that is to say to form an extension of the seat surface, and with the aid of the end wall yoke 27 and the (indicated) textile side parts 28 a closed trough-like head part can be formed in the pushchair.

A construction of pushchair which differs from that described above, in respect of the construction of its fastening device 13', is shown in FIGS. 5 and 6. In these Figures identical components are given in the same reference numerals, while corresponding parts are given the same reference numerals with the addition of a dash. The fastening device 13' has on each side, instead of a rigid arm, two lever arms 14a and 14b articulated to one another. The arms 14a are mounted by means of a crossbar 15a, which connects them together, on the swivel bearing 16 of the chassis struts 6, as in the example shown in FIGS. 1 to 4. The lever arms 14b are mounted for swivelling by means of bearing bores 29 on articulation points 30 of the chassis struts 7. The articulation 31 between the arms 14a and 14b connects the free end of the arm 14a to a region of the arm 14b remote from both ends. The arms 14b are in each case situated outside the arms 14a. The extension 32 of the arm 14b freely projecting beyond the articulation 31 follows a curved path. A cross strut 33 connects the ends of the extensions 32 of the arms on the two sides.

FIG. 5 shows the fastening device 13' in its dead centre position, which corresponds to the fastening position: the arms 14b assuming in relation to the arms 14a a position in which the cross strut 33 rests from above on the arms 14a. A relative movement between the arms 14a and 14b is therefore possible only in the form of a downward movement of the arms 14a in the region of the crossbar 15a, that is to say by means of the pedal 19a, or in the form of a downward movement of the arms 14b in the region of their bearing bores 29, whereby the cross strut 33 is moved upwards. This movement is the unlocking movement, the initial stage of which is shown in FIG. 6. It can be made through the operation of the pedal 19a without noteworthy resistance only when the seat board 4, which is to be imagined to be above the crossbar 15a and the cross strut 33, is not under load, that is to say when there is no child sitting in the pushchair. The loading of the seat surface 4 forces the cross strut 33 downwards and thus forces the fastening device 13' into the dead centre position described. Additional securing by means of a spring is therefore unnecessary.

The invention is not restricted to the illustrated examples. An essential consideration is the simple folding and the fastening device which prevents unintentional folding of the pushchair while a child is sitting in it. Variable arrangements include the cross connections between the arms of the fastening device, the shape, size and design of a foot pedal, the construction of the safety yoke and its connection to the various components, and also the construction of individual articulations.

I claim:

1. A folding pushchair comprising: a chassis, which is provided on each side with first and second chassis struts carrying wheels at their bottom ends and pivotally connected so that they can swing apart out of a folded position, in which they lie side by side, into a position of use, and are securable in the position of use by means of a fastening device; and, joined to the chassis, a push handle, a back part and a seat part; the push handle being joined on each side of the pushchair to the first chassis strut by means of a first intermediate link and to the second chassis strut by means of a second intermediate link; the pivot point in which the second intermediate link is joined to the push handle lying at a distance above the pivot point at which the first intermediate link is joined at the push handle; the fastening device being pivotable upwards, about a bearing on the first chassis strut; out of a fastening position, in which the fastening device extends rigidly between the first and second chassis struts, into a released position to allow relative movement of the two chassis struts; and the seat part being supported on the fastening device in such a manner that it rests on the device when the latter is in its fastening position.

2. A pushchair according to claim 1, characterized in that the fastening device comprises, on each side, an arm which, in the fastening position, extends from the bearing on the first chassis strut to a point of action on the second chassis strut.

3. A pushchair according to claim 1, characterized in that arms at the sides of the fastening device are joined together to form a frame by means of crossbars.

4. A pushchair according to claim 3, characterized in that the frame of the fastening device serves as support for a seat board connected to it.

5. A pushchair according to claims 1 or 4, characterized in that the back part is joined to the push handle.

6. A pushchair according to claims 1 or 4, characterized in that a pedal is provided on the fastening device for the operation thereof.

7. A pushchair according to claim 1, characterized in that an arm of the fastening device is of one-piece rigid construction and has a latching means at its end remote from the bearing on the first chassis strut; and in that the arm is connectable by latching to the second chassis strut in the fastening position.

8. A pushchair according to claim 7, characterized in that the latching means is a nose on the end of the arm, and a pin over which the nose is engagable is provided on the second chassis strut.

9. A pushchair according to claim 7 or 8, characterized in that a spring for holding the latching means in its engaged position is disposed between the arm and the first chassis strut.

10. A pushchair according to claims 1 or 4, characterized in that an arm of the fastening device consists of two lever arms each of which is pivoted to the respective one of the first and second chassis struts and which are connected together by an articulation providing a center of pressure.

11. A pushchair according to claim 10, characterized in that one of the lever arms has an extension projecting beyond the articulation connecting it to the other lever arm, and that this extension has a stop adapted to bear laterally against the other lever arm.

12. A pushchair according to claim 11, characterised in that the fastening device has an arm on each side and the free ends of the lever arm extensions are joined by a cross strut forming the stop.

13. A pushchair according to claim 12, characterised in that a seat board is fastened on one pair of lever arms and is supported on the cross strut of the other pair of lever arms.

14. A pushchair according to claim 1, characterized in that the pivot point in which the first intermediate link is joined to the push handle lies at a distance above the lower end of the push handle.

15. A folding pushchair comprising:
a chassis having first and second pivotally connected chassis struts, each strut having a wheel assembly coupled to its lower end, the struts being positionable in a folded position in which the struts are side by side in close proximity, and in a use position in which the struts are spaced apart;
a push handle joined to the first strut by a first intermediate link, and joined to the second strut by a second intermediate link, the links being coupled to the handle at separate locations;
means for fastening the struts in the use position, said fastening means being upwardly pivotable away from wheel assemblies from a fastening position to a release position for permitting relative movement of the struts from the use position to the folded position; and a seat part operably coupled to said chassis, said seat part being supported by the fastening means with the fastening means in the fastening position to resist upward pivotal movement of the fastening means to said release position with a child sitting on the seat part.

16. A pushchair according to claim 15, wherein the fastening means includes a spreading arm extending between the first and second chassis struts when the fastening means is in the fastening position to maintain the struts in the spaced-apart use position.

17. A pushchair according to claim 15, the fastening means being pivotable upwards, about a bearing on the first chassis strut, out of the fastening position.

18. A pushchair according to claim 15, wherein the fastening means comprises, on each side, an arm which, in the fastening position, extends from a bearing on the first chassis strut to a point of action on the second chassis strut.

19. A pushchair according to claim 15, including arms at the sides of the fastening means joined together to form a frame by means of crossbars.

20. A pushchair according to claim 15, the fastening means including an arm of one-piece rigid construction and the arm having a latching means at one end and the other end being connected to a bearing on the first chassis strut; the arm being connectable by latching to the second chassis strut in the fastening position.

21. A pushchair according to claim 15, the fastening means comprising two lever arms, each of which is pivoted to the respective one of the first and second chassis struts and which are connected together by an articulation providing a center of pressure.

22. A pushchair according to claim 21, the articulation being upwardly pivotable from the fastening position to the release position to permit collapse of the struts to the folded position.

23. A pushchair according to claim 21, one of the struts having an upwardly extending extension coupled to a strut-engaging stop for preventing downward pivotal movement of the articulation from the fastening position.

24. A pushchair according to claim 15, wherein the first link is pivotally coupled to the push handle at a first location above the lower end of the push handle, and the second link is pivotally coupled to the push handle at a second location above the first location.

25. A folding stroller having a chassis which is provided on each side with first and second chassis struts carrying wheels in the portion of their lower ends and being pivotally connected to each other in the portion of their upper ends such that they are movable from a folded position, in which they lie side by side, into a position of use in which they form an angle which is open downwards, and further including a seat part supported by said chassis, a back-rest part and a push handle having a pair of push handle struts respectively connected on both vehicle sides to said first chassis strut via a first intermediate link and to said second chassis strut via a second intermediate link, in such a manner that in the position of use said push handle is obliquely directed rearwards and upwards with respect to a child and is located substantially parallel next to said chassis struts in the folded position, characterized in that the push-handle struts of said push handle (2) are respectively articulated via a yoke (10) to a mechanism (9) pivotally connecting said chassis struts (6 and 7) at their upper ends, and said two intermediate links (11 and 12) are articulated to said push-handle strut and said chassis struts below said yoke, and including a fastening device (13 and 13') which serves as a support for said seat part (4), and is movable by a pivotal movement about a bearing (16) on a chassis strut (6) from a fastening position, in which it rigidly extends between said first and second chassis struts (6 and 7), into a release position for the folding movement.

26. A folding stroller according to claim 25, characterized in that the first intermediate link is joined to the push handle at a pivot point lying at a distance above the lower end of the push handle, the pivot point at which the second intermediate link is joined to the push handle being at a distance above the pivot point at which the first intermediate link is joined to the push handle.

27. A folding stroller according to claim 25, characterized in that the fastening device comprises, on each side, an arm which, in the fastening position, extends from the bearing on the first chassis strut to a point of action on the second chassis strut.

28. A folding stroller according to claim 27, characterized in that arms at the sides of the fastening device are joined together to form a frame by means of crossbars.

29. A folding stroller according to claim 28, characterized in that the frame of the fastening device serves as support for a seat board connected to it.

30. A folding stroller according to claim 25, characterized in that the back part is joined to the push handle.

31. A folding stroller according to claim 25, characterized in that a pedal is provided on the fastening device for the operation thereof.

32. A folding stroller according to claim 25, characterized in that an arm of the fastening device is of one-piece rigid construction and has a latching means at its end remote from the bearing on the first chassis strut; and in that the arm is connectable by latching to the second chassis strut in the fastening position.

33. A folding stroller according to claim 32, characterized in that the latching means is a nose on the end of the arm, and a pin over which the nose is engagable is provided on the second chassis strut.

34. A folding stroller according to claim 32, characterized in that a spring for holding the latching means in its engaged position is disposed between the arm and the first chassis strut.

35. A folding stroller according to claim 25, characterized in that an arm of the fastening device consists of two lever arms each of which is pivoted to the respective one of the first and second chassis struts and which are connected together by an articulation providing a center of pressure.

36. A folding stroller according to claim 35, characterized in that one of the lever arms has an extension projecting beyond the articulation connecting it to the other lever arm, and that this extension has a stop adapted to bear laterally against the other lever arm.

37. A folding stroller according to claim 36, characterized in that the fastening device has an arm on each side and the free ends of the lever arm extensions are joined by a cross strut forming the stop.

38. A folding stroller according to claim 37, characterized in that a seat board is fastened on one pair of lever arms and is supported on the cross strut of the other pair of lever arms.

* * * * *